United States Patent
Nishimura et al.

(10) Patent No.: US 6,854,889 B2
(45) Date of Patent: Feb. 15, 2005

(54) HYDRODYNAMIC PRESSURE BEARING, SPINDLE MOTOR IN WHICH IT IS UTILIZED, AND DISK-DRIVE DEVICE FURNISHED WITH THE SPINDLE MOTOR

(75) Inventors: Hideki Nishimura, Ohmihachiman (JP); Kunihiro Shida, San Jose, CA (US); Wataru Yamauchi, Hikone (JP)

(73) Assignee: Nidec Corporation, Kyoto (JP)

( * ) Notice: Subject to any disclaimer, the term of this patent is extended or adjusted under 35 U.S.C. 154(b) by 77 days.

(21) Appl. No.: 10/248,947

(22) Filed: Mar. 4, 2003

(65) Prior Publication Data

US 2004/0175062 A1 Sep. 9, 2004

(51) Int. Cl.$^7$ ............................ F16C 32/06; F16C 33/74
(52) U.S. Cl. ........................................ 384/119; 384/132
(58) Field of Search ................................. 384/132, 107, 384/119, 100, 121, 124; 360/99.08, 98; 310/90

(56) References Cited

U.S. PATENT DOCUMENTS

| | | | |
|---|---|---|---|
| 5,558,445 A | | 9/1996 | Chen et al. |
| 5,768,784 A | * | 6/1998 | Williams et al. ............ 384/100 |
| 5,876,124 A | | 3/1999 | Zang et al. |
| 6,118,620 A | * | 9/2000 | Grantz et al. ................ 384/107 |
| 6,404,087 B1 | | 6/2002 | Ichiyama |
| 2002/0053845 A1 | * | 5/2002 | Herndon et al. ............. 384/121 |
| 2003/0133633 A1 | * | 7/2003 | Nakamura ................... 384/107 |

FOREIGN PATENT DOCUMENTS

JP       2000-354349 A       12/2000

* cited by examiner

Primary Examiner—Thomas R. Hannon
(74) Attorney, Agent, or Firm—James Judge (57) ABSTRACT

Spindle-motor hydrodynamic bearing configuration having conical taper seals on the thrust-bearing ends. The spindle motor shaft is supported in a bore through the rotor by neighboring radial and thrust hydrodynamic bearings constituted through radial micro-gaps cylindrically between the shaft and rotor, axial micro-gaps between thrust plates on either shaft end and recesses endwise in the rotor bore, dynamic-pressure-generating grooves in the micro-gap forming surfaces, and lubricant retained continuously in the radial and axial micro-gaps. The thrust plates are at least partially conical, tapering axially outward. A ring fitted in each rotor bore recess has a conical inner peripheral surface corresponding to the opposing conical surface of the thrust plate, forming a taper seal sloped with respect to the rotational axial center of the motor. The gap clearance dimension gradually expands heading axially outward, wherein the lubricant forms an axial-end gas-liquid interface to function as a taper seal.

18 Claims, 3 Drawing Sheets

HYDRODYNAMIC PRESSURE BEARING, SPINDLE MOTOR IN WHICH IT IS UTILIZED, AND DISK-DRIVE DEVICE FURNISHED WITH THE SPINDLE MOTOR

BACKGROUND OF INVENTION

1. Technical Field

The present invention relates to hydrodynamic pressure bearings, to spindle motors in which such bearings are utilized, and to disk-drive devices furnished with such spindle motors. The invention in particular relates to hydrodynamic pressure bearings capable of handling high rpm, spindle motors in which they are utilized, and disk-drive devices furnished with the spindle motors.

2. Description of the Related Art

The rotor in a spindle motor is rotatively supported along its axis by bearing means in a configuration such as disclosed for example in U.S. Pat. No. 5,558,445. This conventional spindle motor comprises a pair of thrust plates disposed on the upper and lower portions of a stationary shaft in its axial direction. A radial bearing section located between the pair of thrust plates is constituted by dynamic-pressure-generating striations formed between the outer circumferential surface of the stationary shaft and, opposing the outer circumferential surface in the radial direction, the inner circumferential surface of the rotor, and by lubricating oil retained therein. Under rotation of the rotor the dynamic-pressure-generating striations urge the lubricating oil in a predetermined direction to generate bearing pressure for supporting load on the rotor in the radial direction. Likewise, a pair of thrust bearing sections is constituted by dynamic-pressure-generating striations formed between the mutually opposing axially inward faces of each thrust plate, and the rotor axial faces opposing them in the axial direction, and by lubricating oil retained therein. Under rotation of the rotor the dynamic-pressure-generating striations urge the lubricating oil in a predetermined direction to generate bearing pressure for supporting load on the rotor in the thrust direction. The conventional configuration of a spindle-motor rotor bearing means meanwhile comprises first and second taper-seal sections for preventing the lubricating oil from leaking out to the bearing exterior. The first and second taper seal sections are configured in between seal caps opposing the thrust plates, and the rotor where it opposes the thrust plates, to vary in both radial and axial clearance.

Advantages to a configuration of this sort are that with the structure of the bearing sections being symmetrical, it imparts identical characteristics to, and therefore stabilizes, the rotation of the spindle motor no matter what its orientation, and that it enhances the component-material processing yield rate.

In the oil sealing structure in the foregoing conventional configuration, the first and second taper seal sections are ranged continuously. In this configuration, the position of the oil interface (gas-liquid interface) under ordinary conditions is positioned within the first taper seal section—where the clearance dimension varies in terms of the radial gap formed in between the outer circumferential surface of the thrust plate and the inner circumferential surface of the rotor; and under the action of centrifugal force during routine rotation, the position of the oil interface is made to encroach into the second taper seal section—where the clearance dimension varies in terms of the axial gap formed in between the upper face of the thrust plates and the lower face of the seal caps. This movement of the oil interface enlarges the capacity of the seal sections; at the same time, the taper-seal configuration directs the oil interface radially inward, exploiting centrifugal force to press the oil interface heading toward the thrust bearing sections and prevent the oil from flowing out.

The clearance dimension of the taper seal sections in terms of the gaps formed within the seal sections gradually expands parting off from the bearing sections, which produces a disparity in capillary force on the oil boundaries according to the position where each forms. If the amount of oil retained in the bearing sections has decreased, this disparity in capillary force acts to supply oil from the taper seals to the bearing sections. Likewise, if due to temperature elevation or the like the volume of oil retained within the bearing sections has increased, the taper seal sections function to accommodate that increase.

In applications in which the rotational speed of the spindle motor is sped still higher the influence of centrifugal force on the oil grows stronger, consequently enlarging the amount of oil flowing from the first taper seal section into the second taper seal section. Meanwhile, owing to dimensional constraints the second taper seals have in some cases been furnished orthogonal to the rotational center axis of the spindle motor. Lack thus of sufficient capacity secured to accommodate the greater amount of oil flow at higher rpm will be cause for concern that oil will flow out to the bearing exterior.

Another consequence of the amplified influence of centrifugal force due to heightened-speed rotation is that oil within the first taper seal section is torn off the outer circumferential surface of the thrust plate and becomes stuck on the rotor inner circumferential surface.

Within the thrust bearing section during high-speed rotation oil migrates radially outward under centrifugal force, bringing the retained amount of oil into a lowered state. The taper seal sections should then serve, as noted above, in a capacity of supplying oil to the bearing sections when the amount of oil retained therein has decreased; but oil becoming stuck on the inner circumferential surface of the rotor by the action of centrifugal force spoils the continuity of the oil, meaning that the supply of oil to the bearing sections under high rpm conditions will become inadequate. Depletion in the amount of oil retained in the thrust bearing sections impairs the bearing rigidity, which not only destabilizes rotational support, but also gives rise to contact and slippage between the thrust plate and the rotor occurs, producing seizure.

SUMMARY OF INVENTION

An object of the present invention is to realize higher-rpm-handling hydrodynamic bearings with which sealing strength may be fortified and the supplying of oil to the thrust bearing sections may be stabilized, and moreover in which the volume within the taper seal sections is enlarged to enable a sufficient amount of oil to be retained therein.

Another object is to realize a spindle motor that enables preventing oil leakage even due to high-speed rotation.

A different object of the present invention is to realize a disk-drive device that makes it possible to drive data recording disks at high speed, and is of superior reliability and durability.

In one example of a hydrodynamic bearing in the present invention, a thrust plate that between it and a stepped portion furnished in a sleeve forms a thrust bearing is shaped approximately conically, a portion of its outer peripheral surface being formed with a sloping-face contour such that at least a portion of the thrust plate shrinks in outer diameter with further separation from one of its axially directed faces. Then a ring-shaped member, the inner peripheral surface of which is formed into a sloping-face contour such that heading outward from the radially inward edge the inner diameter expands, is fitted on the inner peripheral surface of the stepped portion, which opposes the outer peripheral surface of the sloping-face contour of the thrust plate. A taper seal section that with respect to the rotational center axis slopes heading inward from the radially outward edge, and whose gap clearance dimension gradually expands parting away from the thrust bearing section, is thereby formed in between the inner peripheral surface of the ring-shaped member and the outer peripheral surface of the thrust plate. The interface of lubricant retained in the thrust bearing forms within this taper seal section.

Contouring the taper seal on the thrust-bearing end to be sloped with respect to the rotational axial center in a hydrodynamic bearing employing oil or a like lubricant as the working fluid enlarges the capacity of the taper seal interior compared to the case in which the taper seal section is configured in a direction either parallel or orthogonal to the rotational axis. At the same time, a structure is adopted enabling lubricant to be supplied from the taper seal section stably to the thrust bearing section even during high-speed rotation, without occurrence of the lubricant fragmenting under centrifugal force.

Lubricant may be retained continuously between the outer periphery of the thrust plate and the thrust bearing section with this hydrodynamic bearing even during high-speed rotation, without the lubricant being torn off under centrifugal force from the outer circumferential surface of the thrust plate. The fact, furthermore, that the interface of the lubricant heads in a sloping direction with respect to the rotational center axis means that centrifugal force acts in a direction in which it presses down on the lubricant interface, whereby the seal strength is more highly sustained.

A hydrodynamic bearing of this sort is also utilized to support rotation of the rotor hub in a spindle motor of the present invention. Not only does this consequently enable high-speed, high-precision rotational support, but also the fact that incidents of seizure in the bearing sections are prevented enables rendering the spindle motor superior in reliability and durability.

In addition, a disk-drive device of the present invention drives data-recording disks by means of a spindle motor furnished with the foregoing hydrodynamic bearing—which consequently not only enables high speed, high-precision rotational support, but also makes for a disk-drive device rendered superior in reliability and durability.

From the following detailed description in conjunction with the accompanying drawings, the foregoing and other objects, features, aspects and advantages of the present invention will become readily apparent to those skilled in the art.

DETAILED DESCRIPTION

Figure 1:
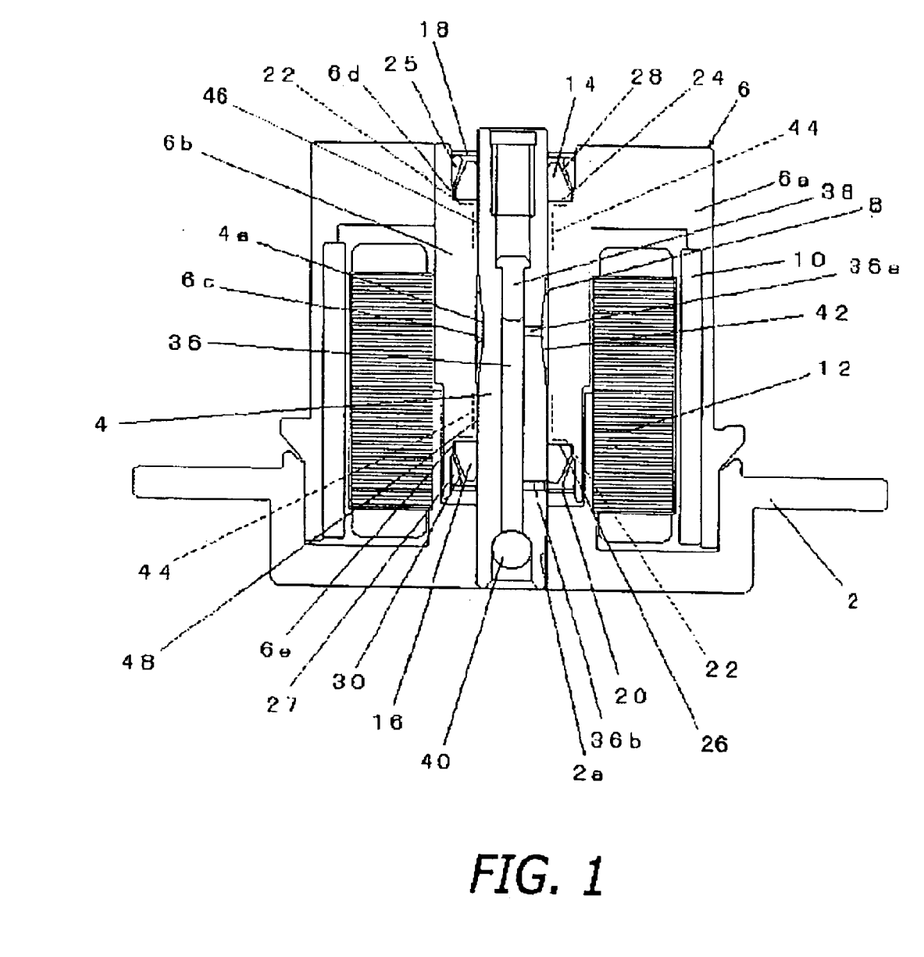
FIG. 1 is a vertical sectional view schematically illustrating the configurational outline of a spindle motor in one embodiment of the present invention.

Embodiments relevant to the present invention of a hydrodynamic bearing, a spindle motor in which the hydrodynamic bearing is utilized, and a disk-drive device equipped with the spindle motor will be explained in the following with reference to FIGS. 1 through 3; the present invention is not, however limited to the embodied examples set forth below.

The spindle motor represented in the figures is furnished with a bracket 2, a shaft 4 the exterior of one end of which is fixedly fitted into a central opening 2a in the bracket 2, and a rotor 6 rotative relative to the shaft 4. The rotor 6 is furnished with a rotor hub 6a on the outer periphery of which storage disks (illustratively represented as data-recording disks 53 in FIG. 3) are loaded, and a sleeve 6b disposed along the inner periphery of the rotor hub 6a and axially supported by the shaft 4 via a micro-gap in which lubricant 8 is retained. Rotor magnets 10 are fastened to the inner periphery of the rotor hub 6a by adhesive means, and a stator 12 is fitted to the bracket 2, radially opposing the rotor magnets 10.

A bore 6c is formed in the approximate center of the sleeve 6b. The inner circumferential surface of the bore 6c axially extending through the sleeve 6b therein is at an interval from the outer circumferential surface of the shaft 4 to form a micro-gap in which lubricant 8 is retained. Radially outwardly projecting disk-shaped upper thrust plate 14 and lower thrust plate 16 are mounted respectively to the upper portion and the lower portion of the shaft 4.

An upper stepped section 6d and a lower stepped section 6e that are diametrically larger than the outer diameter of the upper thrust plate 14 and the lower thrust plate 16 are formed in regions of the bore 6c that correspond to the upper and lower thrust plates 14 and 16. The rims along the open end of the upper stepped section 6d and of the lower stepped section 6e are respectively closed off by an upper seal cap 18 and a lower seal cap 20.

An upper micro-gap in which lubricant 8 is retained, and upper dynamic-pressure-generating grooves 22 compose an upper thrust bearing section 24. The upper micro-gap 8 is formed in between a planar surface portion of the stepped section 6d, extending from the inner perimeter of the bore 6c to the inner perimeter of the upper stepped section 6d, and the lower face (axially inward face) of the upper thrust plate 14. The dynamic-pressure-generating grooves 22 are formed on the stepped section 6d planar surface, for generating dynamic pressure in the lubricant 8 attending rotation of the rotor 6.

In turn, a lower micro-gap in which lubricant 8 is retained, and lower dynamic-pressure-generating grooves 22 compose a lower thrust bearing section 26. The lower micro-gap 8 is formed in between a planar surface portion of the stepped section 6e, extending from the inner perimeter of the bore 6c to the inner perimeter of the lower stepped section 6e, and the upper face (axially inward face) of the lower thrust plate 16. The dynamic-pressure-generating grooves 22 are formed on the stepped section 6e planar surface, for generating dynamic pressure in the lubricant 8 attending rotation of the rotor 6. Spiral grooves of the pump-in type are utilized for the dynamic-pressure-generating grooves 22 formed in the upper and lower thrust bearing sections 24 and 26. The grooves 22 thus generate dynamic pressure that pressure-sends the lubricant 8 in the respective thrust bearing sections 24, 26 heading toward the shaft 4. It will be understood that the grooves for generating dynamic pressure can as well be formed either on the axially inward faces of the upper and lower thrust plates 14 and 16, or both on the planar surface portions of the upper and lower stepped sections 6d, 6e and on the axially inward faces of the upper and lower thrust plates 14 and 16.

Thus rendering as spiral grooves the dynamic-pressure-generating grooves 22 in the upper and lower thrust plates 24, 26 enables the outer diameter of the upper and lower thrust plates 14, 16 to be made smaller compared to a case in which herringbone grooves configured in combination with twin sets of spiral grooves in mutually opposite directions are utilized. Consequently the impact that the lower thrust bearing section 26 has on the magnetic circuit composed of the rotor magnets 10 and stator 12 can be lessened, which serves in gaining adequate drive torque. Moreover, the fact that the viscous resistance produced in the lubricant 8 with spiral grooves during rotation of the spindle motor is small compared to that produced with herringbone grooves means less harm to the upper and lower thrust bearing sections 24, 26 and heightened electrical efficiency of the spindle motor. Curbed consumption of electric power by the spindle motor is consequently made possible.

Figure 2:
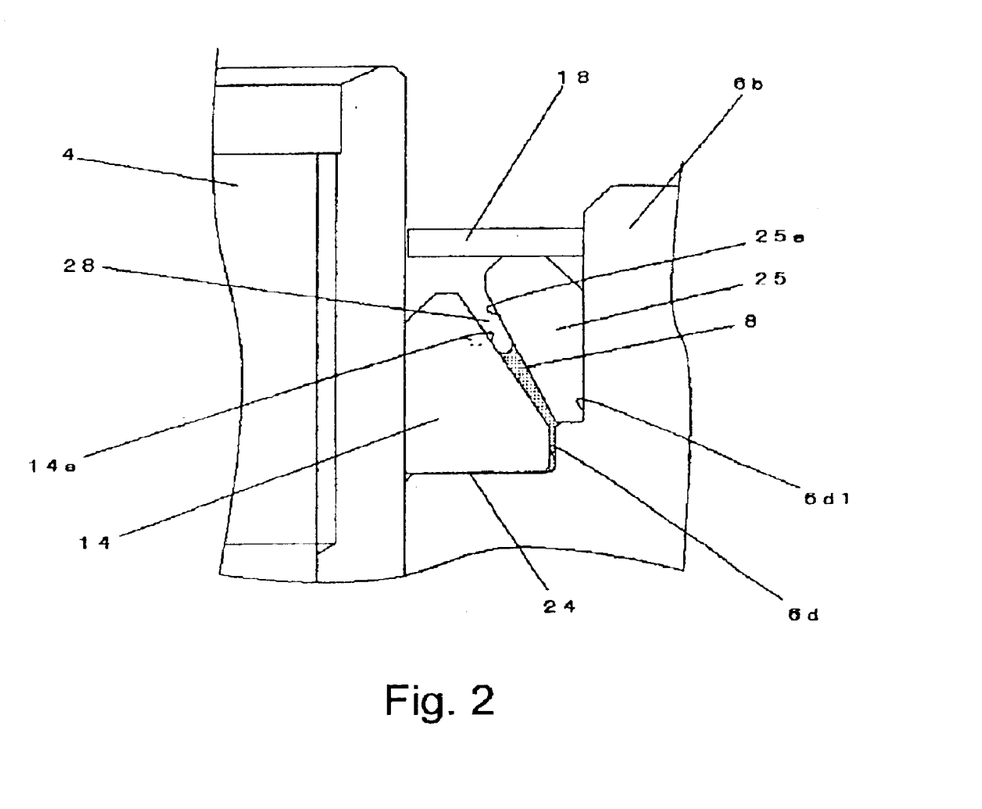
FIG. 2 is an enlarged fragmentary sectional view schematically illustrating the configurational outline of an upper thrust plate and its environs in the spindle motor depicted in FIG. 1.

As represented in FIG. 2 in an enlarged, fragmentary diagram, the outer peripheral surface of the upper thrust plate 14 is formed into a conical face 14a after extending approximately parallel to the rotational center axis from the outer peripheral edge of the axially inward face. The conical face 14a slopes heading radially inward with respect to the rotational center axis. Furthermore, an upper ring-shaped member 25 is affixed, by for example adhesive or press-fitting means, to the inner circumferential surface of the upper stepped section 6d on a small stepped portion 6d1 formed by notching a portion of the inner circumferential surface. The inner peripheral surface of the upper ring-shaped member 25 radially opposes the conical face 14a of the upper thrust plate 14, and is formed in a sloping surface 25a such that the clearance dimension of the gap between it and the conical face 14a gradually widens toward the upper seal cap 18, i.e. expands the further the separation of the clearance dimension is from the upper thrust bearing section 24.

As held in the upper thrust bearing 24, the lubricant 8 is retained along a gap approximately parallel to the rotational center axis, formed in between the upper thrust plate 14 and the inner circumferential surface of the upper stepped portion 6d. The lubricant 8 then forms an interface (gas-liquid interface) within the gap formed in between the upper-thrust-plate conical face 14a and the sloping surface 25a of the ring-shaped member 25, whose clearance dimension gradually expands the more the gap approaches the upper seal cap 18. In particular, the gap formed in between the upper-thrust-plate conical face 14a and the sloping surface 25a of the ring-shaped member 25 functions as an upper taper seal 28.

In this case the inclination angle of the conical face 14a of the upper thrust plate 14 is established to be within a range of about 20 to 35 degrees, preferably about 26 to 33 degrees, with respect to the rotational center axis. Likewise, the inclination angle of the sloping surface 25a of the ring-shaped member 25 is established to be within a range of about 15 to 30 degrees, preferably about 20 to 27 degrees, with respect to the rotational center axis. The taper angle of the upper taper seal 28 that is formed in between the conical face 14a and the sloping surface 25a is in turn established to be within a range of about 2 to 15 degrees, preferably about 5 to 10 degrees.

It should be understood that although the details are not particularly illustrated in the figures, a lower taper seal 30 is formed about the outer periphery of the lower thrust plate 16. In a configuration likewise as about the outer periphery of the upper thrust plate 14, the lower taper seal 30 is formed between the lower thrust plate 16 and a radially opposing lower ring-shaped member 27.

In this instance, the minimum clearance dimension of the upper taper seal 28 is set to be greater than the clearance dimension of the gap formed in between the outer peripheral surface of the upper thrust plate 14 and the inner peripheral surface of the upper stepped portion 6d, approximately parallel to the rotational center axis. Likewise, the clearance dimension of the upper thrust bearing-section 24 gap is set to be smaller than the clearance dimension of the gap formed in between the outer peripheral surface of the upper thrust plate 14 and the inner peripheral surface of the upper stepped portion 6d, approximately parallel to the rotational center axis.

This means that should the amount of lubricant 8 retained in the upper thrust bearing section 24 decrease, lubricant 8 retained within the upper taper seal 28 will under capillary force be supplied along the gap formed in between the outer peripheral surface of the upper thrust plate 14 and the inner peripheral surface of the upper stepped portion 6d, approximately parallel to the rotational center axis, to the upper thrust bearing section 24.

Conversely, should the volume of the lubricant 8 retained in the upper thrust bearing section 24 expand due to temperature elevation or the like, the lubricant 8 interface will shift in the upper-taper-seal 28 direction in which its clearance dimension widens further, whereby the lubricant 8 volumetric increase will be accommodated within the upper taper seal 28.

What is more, inasmuch as the upper taper seal 28 is configured to be inclined with respect to the rotational center axis, the lubricant 8 interface forms heading radially inward in accordance with the inclination angle of the upper taper seal 28. The fact that the interface of the lubricant 8 is accordingly pressed under centrifugal force toward the upper thrust bearing section 24 when the spindle motor is rotating fortifies the seal strength. At the same time, the fact that the conical face 14a of the upper thrust plate 14 and the sloping surface 25a of the ring-shaped member 25 themselves are inclined relative to each other with respect to the rotational center axis means that lubricant 8 will not be torn from the conical face 14a and stick to the sloping surface 25a under the influence of centrifugal force when the spindle motor is rotating. Even in high-rpm spindle motor applications, the lubricant 8 is accordingly impeded from flowing out from the seal areas. Furthermore, the continuity of the lubricant 8 retained from the upper taper seal 28 through to the upper thrust bearing section 24 will not be broken even under such applications, nor will the supplying of lubricant 8 from the upper taper seal 28 to the upper thrust bearing section 24 be insufficient.

In addition, inclining the upper taper seal 28 with respect to the rotational center axis means that the dimension of the seal area is greater—and therefore that its capacity expands—by comparison to cases in which taper seals are configured in a direction parallel or orthogonal to the rotational center axis.

Furthermore, in the upper and lower thrust bearing sections 24, 26 inasmuch as the dynamic-pressure-generating grooves 22 are spiral grooves of the pump-in type, the dynamic pressure generated in each set pressure-urges the lubricant 8 heading radially inward and therefore the dynamic pressure in the upper and lower thrust bearing sections 24, 26 is generated in a pressure gradient that heading radially inward grows larger. On account of the gradient, bubbles that arise within the lubricant 8 retained in the upper and lower thrust bearing sections 24, 26—at such times as when the bearing sections are charged with lubricant 8—migrate from radially inward of the bearing sections where the pressure is high, toward radially outward where the pressure is low, finally migrating toward the interface of the lubricant 8 in the upper and lower taper seals 23, 30 where the clearance dimension in the lubricant-retaining gap is greatest and the pressure is lowest, and opening out into the atmosphere.

An annular depression 4a composed of a pair of sloping faces that slope heading axially inward, such that the gap between the shaft 4 outer circumferential surface and the bore 6c inner circumferential surface expands, is formed in the approximate center of the outer circumferential surface of the shaft 4. Formed within the shaft 4, a communicating passage 36 that communicates with the atmosphere opens on the annular depression 4a.

The communicating passage 36 is composed of a lengthwise hole that passes axially through the shaft 4, and first and second apertures 36a and 36b. The first aperture 36a extends radially from the lengthwise hole, opening on the annular depression 4a. The second aperture 36b opens into a space continuous with the lower, second taper seal 30 and communicating with the bearing exterior through a micro-gap defined in between the inner circumferential surface of the lower seal cap 20 and the outer circumferential surface of the shaft 4. Here, after machining and washing of the shaft 4 has been completed, the mouths of the lengthwise hole opening on either end of the shaft 4 are sealed off by means of, e.g., sealing members 38, 40 made from an elastic material such as rubber. This means that the bearing space to the inside of the upper and lower seal caps 18 and 20 communicates with the atmosphere only through the micro-gaps formed in between the inner circumferential surfaces of the upper and lower seal caps 18, 20 and the outer circumferential surface of the shaft 4.

Air taken into the communicating passage 36 through the second aperture 36b forms an annular gas intervention 42 in between the depression 4a onto which the first aperture 36a opens and the bore 6c. Lubricant 8 retained within the micro-gap between the shaft 4 outer circumferential surface and the bore 6c inner circumferential surface is divided above/below in the axial direction by the gas intervention 42, whereby the lubricant 8 interfaces within the tapered gap formed between the pair of sloping faces of the depression 4a and the bore 6c inner circumferential surface are created.

Dynamic-pressure-generating grooves 44 for generating dynamic pressure in the lubricant 8 attending rotation of the rotor 6 are formed in regions of the bore 6c inner circumferential surface corresponding to where the lubricant 8 is retained divided above/below, wherein an upper radial bearing section 46 and a lower radial bearing section 48 are constituted. Herringbone grooves having an axially asymmetrical formation are utilized for the dynamic-pressure-generating grooves 44 formed in the upper radial bearing section 46 and for in those formed in lower radial bearing section 48. The dynamic pressure generated in the asymmetrical herringbone grooves thus pressure-urge the lubricant 8 heading axially outward—heading, in other words, toward the neighboring upper and lower thrust bearing sections 24, 26.

The fact that the dynamic-pressure-generating grooves 44 in the upper and lower radial bearing sections 46 and 48 are rendered in a formation in which they pressure-urge the lubricant 8 respectively toward the upper and lower thrust bearing sections 24 and 26 means that bubbles that arise within the lubricant 8 retained in the upper and lower radial bearing sections 46, 48—at such times as when the bearing sections are charged with lubricant 8—will migrate from the bearing area, where the pressure is high, toward the lubricant 8 boundary faces with the gas intervention 42, where the pressure is low. From the gas intervention 42 such bubbles then, through the communicating passage 36, open out into the atmosphere exterior to the bearings.

The dynamic-pressure generating means formed in the upper and lower thrust bearing sections 24 and 26 are spiral grooves 22 in this configuration, and although they alone cannot generate sufficient load-supporting pressure, cooperation of the thrust and radial bearing sections does support loads borne by the rotor 6. That is, inasmuch as the axially asymmetrical herringbone grooves are formed as the dynamic-pressure-generating grooves 44 in the upper and lower radial bearing sections 46 and 48 neighboring the upper and lower thrust bearing sections 24 and 26, during rotation of the spindle motor the lubricant 8 is pressure-urge by the respective spiral grooves and the herringbone grooves in mutually confronting directions, which brings about generation of the dynamic pressure required to bear the loads.

The lubricant 8 interfaces located within the upper and lower taper seals 28 and 30, in the upper and lower thrust bearing sections 24 and 26, and the lubricant 8 interfaces located in the tapered gap defined in between the bore 6c and the pair of sloping faces of the depression 4a, in the upper and lower radial bearing sections 46 and 48 are exposed to identical atmospheric pressure. This is because lubricant 8 in the upper and lower thrust bearing sections 24, 26 is retained in continuity with that retained in the upper and lower radial bearing sections 46, 48 neighboring the thrust bearing sections 24, 26, and because the gas intervention 42 segregating the upper and lower radial bearing sections 46, 48 communicates with the atmosphere through the communicating passage 36.

If on the one hand a lubricant 8 interface in the upper and lower taper seals 28 and 30, or a lubricant 8 interface in the tapered gap defined in between the bore 6c and the pair of sloping faces of the depression 4a, should shift in the direction parting away from the bearing section owing to centrifugal force, or external shock or vibration being applied to the spindle motor, because the lubricant 8 interfaces are exposed to identical atmospheric pressure, the interfaces on the other hand will shift within the tapered gaps in which they are located, as far as the position in which the radii of curvature of the lubricant 8 interfaces become equal. This keeps the seals from being spoiled and stably maintains their efficacy.

Given that the lubricant 8 in the upper and lower radial bearing sections 46, 48 is continuous with that in the neighboring thrust bearing sections 24, 26, from the lubricant 8 interfaces on the one end all the way to the lubricant 8 interfaces on the other, only one point where the dynamic pressure becomes maximal, and no point where it becomes minimal, exists. Accordingly, a configuration can be realized by which bubbles contained within the lubricant 8 are expelled from the interfaces, which automatically position within the tapered gaps to minimize pressure, into the atmosphere external to the bearings.

Thus, bubbles arising within the lubricant 8 retained in the bearing sections migrate toward successively lower pressure, and are released into the atmosphere from the lubricant 8 interfaces. This means that the air bubbles do not linger in the lubricant 8 retained in the bearing sections. What is more, inasmuch as no special configuration for exhausting air bubbles is needed, the spindle motor structure can be simplified.

The radial dimension of the gap defined in between the inner circumferential surfaces of the upper and lower seal caps 18 and 20, and the outer circumferential surface of the shaft 4 is set to be as small as possible. Therefore, when the spindle motor is rotating a differential in flow speed of the air current, generated in response to rotation of the rotor 6, in the axial gap defined in between the upper and lower thrust plates 14, 16 and the upper and lower seal caps 18, 20, and in the radial gap defined by the outer circumferential surface of the shaft 4 and the upper and lower seal caps 18, 20 is produced. This consequently makes greater the resistance to outflow to the spindle motor exterior of vapor (oil mist) that has arisen due to the lubricant 8 gasifying, and keeps vapor pressure in the vicinity of the lubricant 8 interfaces high, which enables preventing further vaporization of the lubricant 8.

Also, applying onto each of the surfaces an oil repellent made from, e.g., a fluoric substance, is the more effective in preventing lubricant 8 from leaking out to the exterior of the spindle motor due to the oil migration phenomenon when the spindle motor is at a standstill wherein centrifugal force does not act on the lubricant 8.

Figure 3:
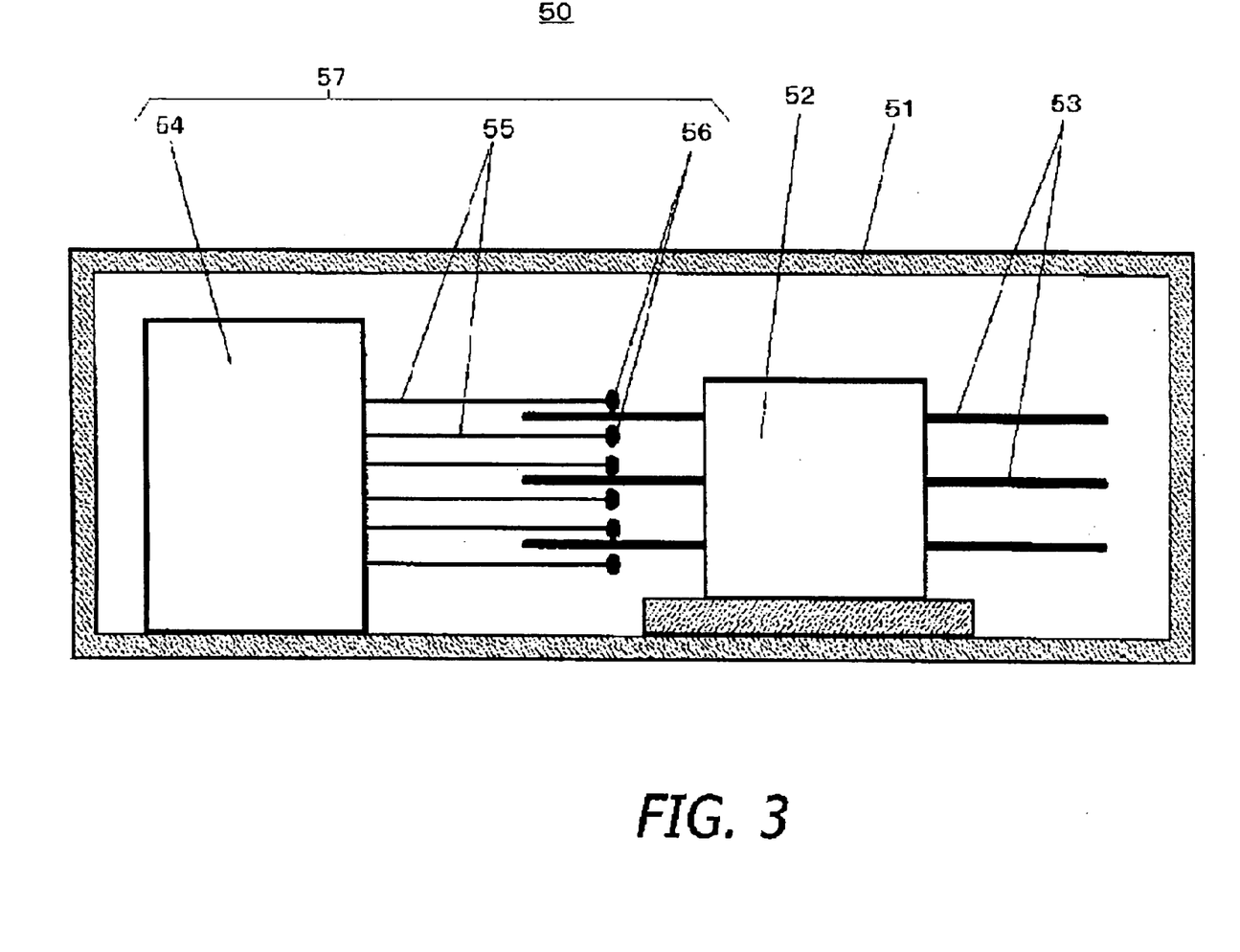
FIG. 3 is a schematic view illustrating the configurational outline of a disk drive device equipped with the spindle motor depicted in FIG. 1.

Reference is now made to FIG. 3, which represents in a schematic view the internal configuration of a general disk-drive device 50. A clean space where dust and debris are extremely slight is formed inside a housing 51, in the interior of which is installed a spindle motor 52 on which platter-shaped disks 53 for recording information are fitted. In addition, a head-shifting mechanism 57 that reads information from and writes information onto the disks 53 is disposed within the housing 51. The head-shifting mechanism 57 is constituted by: heads 56 that read/write information on the disks 53; arms 55 that support the heads 56; and an actuator 54 that shifts the heads 56 and arms 55 over the requisite locations on the disks 53.

Utilizing a spindle motor diagrammatically represented in FIG. 2 as the spindle motor 52 for the disk drive 50 as such enables not only high-speed, high-precision rotational support in, but also superior reliability and durability of, the disk drive 50.

While single embodiments in accordance with the present invention of a hydrodynamic bearing, a spindle motor in which it is utilized, and a disk-drive furnished with the spindle motor have been explained in the foregoing, the present invention is not limited to such embodiments. Various changes and modifications are possible without departing from the scope of the invention.

For example, in machining the upper and lower thrust plates 14 and 16, planar surfaces are provided on the outer periphery of the upper and lower thrust plates 14, 16 out of the necessity of forming such surfaces in order to maintain the gaps, approximately parallel with respect to the rotational center axis, formed in between the upper and lower thrust plates 14, 16 and inner circumferential surfaces of the upper and lower stepped portions 6d, 6e. Nevertheless, in a situation in which there is no such necessity, the conical face can be formed continuing to the outer peripheral edge along the axially inward face of the upper and lower thrust plates 14, 16, without forming such planar surfaces.

What is claimed is:

1. A hydrodynamic bearing comprising:
   a shaft defining a rotational center axis;
   an annular thrust plate provided on, and projecting radially outward from, the outer circumferential surface of said shaft, said thrust plate having an approximately conical form in which at least a portion of said thrust plate shrinks in outer diameter with increasing separation from one of the axial faces of said thrust plate, the outer peripheral surface of said portion therein formed in a sloping-face contour;
   a hollow round cylindrical sleeve in which are formed a stepped portion opposing both the outer circumferential surface of, and said one of the axial faces of, said thrust plate, and continuous with said stepped portion, a radial inner-peripheral surface radially opposing the outer circumferential surface of said shaft via a micro-gap; and
   a ring-shaped member the inner peripheral surface of which is formed into a sloping-face contour such that heading toward its radially outward side from its inward side the inner diameter expands, fitted on an inner circumferential surface of said stepped portion opposing the outer peripheral surface of said sloping-face contour of said thrust plate; wherein
   lubricant is retained, and dynamic-pressure-generating grooves for inducing dynamic pressure in said lubricant are provided, in between the outer circumferential surface of said shaft and the radial inner-peripheral surface of said sleeve, whereby a radial bearing section is configured,
   lubricant is retained, and dynamic-pressure-generating grooves for inducing dynamic pressure in said lubricant are provided, in between said stepped portion and said one of the axial faces of said thrust plate, whereby a thrust bearing section is configured,
   a taper seal section that, with respect to the rotational center axis, slopes heading toward its radially inward side from its outward side, and whose gap clearance dimension gradually expands with increasing separation from said thrust bearing section, is formed in between said ring-shaped member and said approximately conical form of the thrust plate, and
   said lubricant retained in said thrust bearing section forms an interface within said taper seal section.

2. A hydrodynamic bearing as set forth in claim 1, wherein:
   a pair of said thrust plates is arranged neighboring either end of said radial inner-peripheral surface; and
   a pair of said stepped portions, in each of which a said ring-shaped member is fitted, is formed in said sleeve to correspond to said pair of said thrust plates.

3. A hydrodynamic bearing as set forth in claim 1, further comprising an annular flat plate shaped member having a central opening and arranged in said stepped portion, at the axially outward end of said ring-shaped member;
   wherein:
   the inner circumferential surface of said flat plate-shaped member opposes the outer circumferential surface of said shaft via a micro-gap, and
   said taper seal section opens to the exterior through a micro-gap defined in between the inner circumferential surface of said flat plate-shaped member and the outer circumferential surface of said shaft.

4. A hydrodynamic bearing as set forth in claim 1, wherein:

the dynamic-pressure-generating grooves in said thrust bearing section are formed as pump-in spiral grooves so as to induce in said lubricant dynamic pressure that acts heading radially inward;

the dynamic-pressure-generating grooves in said radial bearing section are formed as herringbone grooves having an axially asymmetrical formation so as to induce in said lubricant dynamic pressure that acts heading toward said thrust bearing section; and said lubricant is retained in continuity between said thrust bearing section and said radial bearing section.

5. A hydrodynamic bearing as set forth in claim 1, further comprising an air intervention communicating the approximate midportion axially of said radial inner-peripheral surface with outside air is formed in between the outer circumferential surface of said shaft and said radial inner-peripheral surface;

wherein:

a pair of said radial bearing sections is configured neighboring either axial end of said air intervention.

6. A hydrodynamic bearing comprising:

a shaft defining a rotational center axis;

a pair of annular thrust plates provided on, and projecting radially outward from, the outer circumferential surface of said shaft, said pair of thrust plates having an approximately conical form in which at least a portion of each said thrust plate shrinks in outer diameter with increasing separation from one of the axial faces of each said thrust plate, the outer peripheral surface of said portion therein formed in a sloping-face contour;

a hollow round cylindrical sleeve in which are formed a radial inner-peripheral surface radially opposing the outer circumferential surface of said shaft via a micro-gap, and neighboring either end axially of said radial inner-peripheral surface, a stepped portion opposing both the outer circumferential surface of, and said one of the axial faces of, each said thrust plate; and ring-shaped members the inner peripheral surface of which is formed into a sloping-face contour such that heading toward its radially outward side from its inward side the inner diameter expands, one each fitted on an inner circumferential surface of each said stepped portion opposing the outer peripheral surface of said sloping-face contour of said thrust plate; wherein lubricant is retained, and pump-in spiral grooves through which dynamic pressure that acts heading radially inward is induced in said lubricant are formed, in between each said stepped portion and said one of the axial faces of each said thrust plate, whereby a pair of thrust bearing sections is configured, lubricant is retained in continuity with each said thrust bearing section, and herringbone grooves having an axially asymmetrical formation through which dynamic pressure that acts heading toward neighboring said thrust bearing sections is induced in said lubricant are formed, in between the outer circumferential surface of said shaft and said radial inner-peripheral surface of said sleeve, whereby a pair of radial bearing sections is configured, said lubricant retained in said radial bearing sections is divided axially by an air intervention formed in between the outer circumferential surface of said shaft and said radial inner-peripheral surface of said sleeve, said air intervention opens to outside air through a communicating passage provided in said shaft, a pair of taper seal sections that, with respect to the rotational center axis, each slope heading toward its radially inward side from its outward side, and whose gap clearance dimension gradually expands with increasing separation from said thrust bearing section, is formed in between each said ring-shaped member and said approximately conical form of each thrust plate, and said lubricant retained in each said thrust bearing section forms an interface within each said taper seal section.

7. A hydrodynamic bearing as set forth in claim 6, further comprising a pair of annular flat plate-shaped members each having a central opening and one each arranged in each said stepped portion, at the axially outward end of said ring-shaped member; wherein:

the inner circumferential surface of each said flat plate-shaped member opposes the outer circumferential surface of said shaft via a micro-gap, and each said taper seal section opens to the exterior through a micro-gap defined in between the inner circumferential surface of each said flat plate-shaped member and the outer circumferential surface of said shaft.

8. A hydrodynamic bearing comprising:

a shaft defining a rotational center axis;

a pair of annular thrust plates provided on, and projecting radially outward from, the outer circumferential surface of said shaft, said pair of thrust plates having an approximately conical form in which at least a portion of each said thrust plate shrinks in outer diameter with increasing separation from one of the axial faces of each said thrust plate, the outer peripheral surface of said portion therein formed in a sloping-face contour inclining at an angle of 20 to 35 degrees with respect to the rotational center axis;

a hollow round cylindrical sleeve in which are formed a radial inner-peripheral surface radially opposing the outer circumferential surface of said shaft via a micro-gap, and neighboring either end axially of said radial inner-peripheral surface, a stepped portion opposing both the outer circumferential surface of, and said one of the axial faces of, each said thrust plate; and ring-shaped members the inner peripheral surface of which is formed into a sloping-face contour inclining at an angle of 15 to 30 degrees with respect to the rotational center axis such that heading toward its radially outward side from its inward side the inner diameter expands, one each fitted on an inner circumferential surface of each said stepped portion opposing the outer peripheral surface of said sloping-face contour of said thrust plate; wherein lubricant is retained, and pump-in spiral grooves through which dynamic pressure that acts heading radially inward is induced in said lubricant are formed, in between each said stepped portion and said one of the axial faces of each said thrust plate, whereby a pair of thrust bearing sections is configured, lubricant is retained in continuity with each said thrust bearing section, and herringbone grooves having an axially asymmetrical formation through which dynamic pressure that acts heading toward neighboring said thrust bearing sections is induced in said lubricant are formed, in between the outer circumferential surface of said shaft and said radial inner-peripheral surface of said sleeve, whereby a pair of radial bearing sections is configured, said lubricant retained in said radial bearing sections is divided axially by an air intervention formed in between the outer circumferential surface of said shaft and said radial inner-peripheral surface of said sleeve, said air intervention opens to outside air through a communicating passage provided in said shaft, a pair of taper seal sections that, with respect to the rotational center axis, each slope heading toward its radially inward side from its outward side at an angle of 2 to 15 degrees with respect to the rotational center axis, and whose gap clearance dimension gradually expands with increasing separation from said thrust bearing section, is formed in between each said ring-shaped member and said approximately conical form of each thrust plate, and said lubricant retained in each said thrust bearing section forms an interface within each said taper seal section.

9. A hydrodynamic bearing as set forth in claim 8, further comprising a pair of annular flat plate-shaped members each having a central opening and one each arranged in each said stepped portion, at the axially outward end of said ring-shaped member; wherein:

the inner circumferential surface of each said flat plate-shaped member opposes the outer circumferential surface of said shaft via a micro-gap, and each said taper seal section opens to the exterior through a micro-gap defined in between the inner circumferential surface of each said flat plate-shaped member and the outer circumferential surface of said shaft.

10. A hydrodynamic bearing comprising:

a shaft defining a rotational center axis;

an annular thrust plate provided on, and projecting radially outward from, the outer circumferential surface of said shaft, said thrust plate having an approximately conical form in which at least a portion of said thrust plate shrinks in outer diameter with increasing separation from one of the axial faces of said thrust plate, the outer peripheral surface of said portion therein formed in a sloping-face contour inclining at an angle of 20 to 35 degrees with respect to the rotational center axis;

a hollow round cylindrical sleeve in which are formed a stepped portion opposing both the outer circumferential surface of, and said one of the axial faces of, said thrust plate, and continuous with said stepped portion, a radial inner-peripheral surface radially opposing the outer circumferential surface of said shaft via a micro-gap; and a ring-shaped member the inner peripheral surface of which is formed into a sloping-face contour inclining at an angle of 15 to 30 degrees with respect to the rotational center axis such that heading toward its radially outward side from its inward side the inner diameter expands, fitted on an inner circumferential surface of said stepped portion opposing the outer peripheral surface of said sloping-face contour of said thrust plate; wherein lubricant is retained, and dynamic-pressure-generating grooves for inducing dynamic pressure in said lubricant are provided, in between the outer circumferential surface of said shaft and the radial inner-peripheral surface of said sleeve, whereby a radial bearing section is configured, lubricant is retained, and dynamic-pressure-generating grooves for inducing dynamic pressure in said lubricant are provided, in between said stepped portion and said one of the axial faces of said thrust plate, whereby a thrust bearing section is configured, a taper seal section that, with respect to the rotational center axis, slopes heading toward its radially inward side from its outward side at an angle of 2 to 15 degrees with respect to the rotational center axis, and whose gap clearance dimension gradually expands with increasing separation from said thrust bearing section, is formed in between said ring-shaped member and said approximately conical form of the thrust plate, and said lubricant retained in said thrust bearing section forms an interface within said taper seal section.

11. A spindle motor comprising:

a base member;

a shaft one end portion of which is fixed to said base member, said shaft defining a rotational center axis;

an annular thrust plate provided on, and projecting radially outward from, the outer circumferential surface of said shaft, said thrust plate having an approximately conical form in which at least a portion of said thrust plate shrinks in outer diameter with increasing separation from one of the axial faces of said thrust plate, the outer peripheral surface of said portion therein formed in a sloping-face contour;

a hollow round cylindrical sleeve in which are formed a stepped portion opposing both the outer circumferential surface of, and said one of the axial faces of, said thrust plate, and continuous with said stepped portion, a radial inner-peripheral surface radially opposing the outer circumferential surface of said shaft via a micro-gap;

a rotor hub that rotates together with said sleeve; and a ring-shaped member the inner peripheral surface of which is formed into a sloping-face contour such that heading toward its radially outward side from its inward side the inner diameter expands, fitted on an inner circumferential surface of said stepped portion opposing the outer peripheral surface of said sloping-face contour of said thrust plate; wherein lubricant is retained, and dynamic-pressure-generating grooves for inducing dynamic pressure in said lubricant are provided, in between the outer circumferential surface of said shaft and the radial inner-peripheral surface of said sleeve, whereby a radial bearing section is configured, lubricant is retained, and dynamic-pressure-generating grooves for inducing dynamic pressure in said lubricant are provided, in between said stepped portion and said one of the axial faces of said thrust plate, whereby a thrust bearing section is configured, a taper seal section that, with respect to the rotational center axis, slopes heading toward its radially inward side from its outward side, and whose gap clearance dimension gradually expands with increasing separation from said thrust bearing section, is formed in between said ring-shaped member and said approximately conical form of the thrust plate, and said lubricant retained in said thrust bearing section forms an interface within said taper seal section.

12. A spindle motor as set forth in claim 11, wherein:

a pair of said thrust plates is arranged neighboring either end of said radial inner-peripheral surface; and a pair of said stepped portions, in each of which a said ring-shaped member is fitted, is formed in said sleeve to correspond to said pair of said thrust plates.

13. A spindle motor as set forth in claim 11, further comprising an annular flat plate-shaped member having a central opening and arranged in said stepped portion, at the axially outward end of said ring shaped member; wherein:

the inner circumferential surface of said flat plate-shaped member opposes the outer circumferential surface of said shaft via a micro-gap, and said taper seal section opens to the exterior through a micro-gap defined in between the inner circumferential surface of said flat plate-shaped member and the outer circumferential surface of said shaft.

14. A spindle motor as set forth in claim 11, wherein:

the outer peripheral surface of said thrust plate inclines at an angle of 20 to 35 degrees with respect to the rotational center axis;

the inner peripheral surface of said ring-shaped member inclines at an angle of 15 to 30 degrees with respect to the rotational center axis; and said taper seal section inclines at an angle of 2 to 15 degrees with respect to the rotational center axis.

15. A disk-drive device including:

a housing interiorly in which a clean chamber is formed;

a spindle motor accommodated within the interior of said housing, for driving a data-recording disk; and an information accessing means for writing information into and reading information from requisite locations on said data-recording disk;

the disk-drive device characterized in that said spindle motor comprises a base member; a shaft one end portion of which is fixed to said base member, said shaft defining a rotational center axis; an annular thrust plate provided on, and projecting radially outward from, the outer circumferential surface of said shaft, said thrust plate having an approximately conical form in which at least a portion of said thrust plate shrinks in outer diameter with increasing separation from one of the axial faces of said thrust plate, the outer peripheral surface of said portion therein formed in a sloping-face contour; a hollow round cylindrical sleeve in which are formed a stepped portion opposing both the outer circumferential surface of, and said one of the axial faces of, said thrust plate, and continuous with said stepped portion, a radial inner-peripheral surface radially opposing the outer circumferential surface of said shaft via a micro-gap; a rotor hub on which said data recording disk is carried, said rotor hub rotating together with said sleeve; and a ring-shaped member the inner peripheral surface of which is formed into a sloping-face contour such that heading toward its radially outward side from its inward side the inner diameter expands, fitted on an inner circumferential surface of said stepped portion opposing the outer peripheral surface of said sloping-face contour of said thrust plate; wherein lubricant is retained, and dynamic-pressure-generating grooves for inducing dynamic pressure in said lubricant are provided, in between the outer circumferential surface of said shaft and the radial inner-peripheral surface of said sleeve, whereby a radial bearing section is configured, lubricant is retained, and dynamic-pressure-generating grooves for inducing dynamic pressure in said lubricant are provided, in between said stepped portion and said one of the axial faces of said thrust plate, whereby a thrust bearing section is configured, a taper seal section that, with respect to the rotational center axis, slopes heading toward its radially inward side from its outward side, and whose gap clearance dimension gradually expands with increasing separation from said thrust bearing section, is formed in between said ring-shaped member and said approximately conical form of the thrust plate, and said lubricant retained in said thrust bearing section forms an interface within said taper seal section.

16. A disk-drive device as set forth in claim 15, wherein:

a pair of said thrust plates is arranged neighboring either end of said radial inner-peripheral surface; and a pair of said stepped portions, in each of which a said ring-shaped member is fitted, is formed in said sleeve to correspond to said pair of said thrust plates.

17. A disk-drive device as set forth in claim 15, further comprising an annular flat plate-shaped member having a central opening and arranged in said stepped portion, at the axially outward end of said ring-shaped member;

wherein:

the inner circumferential surface of said flat plate-shaped member opposes the outer circumferential surface of said shaft via a micro-gap, and said taper seal section opens to the exterior through a micro-gap defined in between the inner circumferential surface of said flat plate-shaped member and the outer circumferential surface of said shaft.

18. A disk-drive device as set forth in claim 15, wherein:

the outer peripheral surface of said thrust plate inclines at an angle of 20 to 35 degrees with respect to the rotational center axis;

the inner peripheral surface of said ring-shaped member inclines at an angle of 15 to 30 degrees with respect to the rotational center axis; and said taper seal section inclines at an angle of 2 to 15 degrees with respect to the rotational center axis.

* * * * *